United States Patent [19]

Chu

[11] Patent Number: 4,507,188
[45] Date of Patent: Mar. 26, 1985

[54] ULTRAVIOLET CURABLE FORMULATIONS CONTAINING URETHANE ACRYLATE MONOMERS

[75] Inventor: Yuan C. Chu, East Windsor, N.J.

[73] Assignee: Thiokol Corporation, Chicago, Ill.

[21] Appl. No.: 564,816

[22] Filed: Dec. 21, 1983

[51] Int. Cl.³ .................. C08G 18/10; C08G 18/00; C08F 120/36
[52] U.S. Cl. .................. 204/159.23; 204/159.19; 526/301
[58] Field of Search .................. 204/159.19, 159.23; 526/301

[56] References Cited

U.S. PATENT DOCUMENTS

| | | | |
|---|---|---|---|
| 3,479,328 | 11/1969 | Nordstrom | 526/301 |
| 4,098,918 | 7/1978 | De Majistre | 526/301 |
| 4,279,833 | 7/1981 | Culbertson et al. | 526/301 |
| 4,287,323 | 9/1981 | Tefertiller et al. | 526/301 |
| 4,328,325 | 5/1982 | Marquardt et al. | 526/301 |
| 4,376,800 | 3/1983 | Lu et al. | 526/301 |
| 4,420,527 | 12/1983 | Conley | 428/167 |
| 4,451,636 | 5/1984 | Tsao et al. | 204/159.19 |

*Primary Examiner*—Herbert J. Lilling
*Attorney, Agent, or Firm*—Gerald K. White

[57] ABSTRACT

A coating composition comprising a radiation curable oligomer and a reactive diluent having the formula:

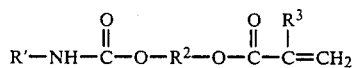

wherein R' is a monovalent aromatic or alkyl radical including from 4 to about 20 carbon atoms, R² is a divalent alkyl radical including from about 2 to about 4 carbon atoms, and R³ is hydrogen or methyl. Addition of the reactive diluent not only reduces the viscosity of the uncured composition to an acceptable value for use as a coating but also surprisingly increases the elongation of the cured coating without reducing its tensile strength. Superior coatings for floor tiles, flooring, and other applications are thus provided.

16 Claims, No Drawings

ULTRAVIOLET CURABLE FORMULATIONS CONTAINING URETHANE ACRYLATE MONOMERS

TECHNICAL FIELD

The invention relates to reactive diluents for addition to radiation curable acrylate oligomers to improve the processing characteristics of the uncured compositions by lowering their viscosity. The cured composition have utility as no-wax coatings for flooring.

BACKGROUND ART

Coating compositions for application to floor tiles and other flooring to provide a no-wax finish are well known. Two examples of oligomers used in such coatings are the UVITHANE 783 and 788 oligomers available from the Specialty Chemicals Division of Thiokol Corporation, Trenton, New Jersey. (UVITHANE is a registered trademark).

Because the particular oligomers useful for flooring coatings are frequently very viscous or solid at the preferred application temperature, reactive diluents are frequently added to the compositions to improve their handling characteristics. (As used here, the term "reactive diluent" refers to an ethylenically unsaturated monomer which is miscible with the principal oligomer, reduces the viscosity of the composition when it is added to the oligomer, and reacts with the oligomer to form a copolymer when the composition is cured by exposure to ultraviolet light or other actinic radiation. A reactive diluent is different from a conventional solvent because it participates in the reaction, rather than evaporating or remaining as a diluent in the cured coating.) One conventional reactive diluent for flooring compositions is N-vinyl pyrrolidone:

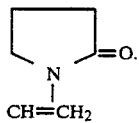
(I)

The use of reactive diluents in general is disclosed in columns 8–9 and 26–27 of U.S. Pat. No. 3,924,023, issued to Boranian et al. on Dec. 2, 1975, and in U.S. Pat. No. 4,287,323, issued to Tefertiller et al. on Sep. 1, 1981 (particularly in column 6).

The choice of reactive diluent will affect the physical characteristics of the acrylate coating and film. In addition to imparting good physical properties (such as elongation) to the cured film, the reactive diluent should have low volatility in the uncured coating and a rapid cure rate.

Several prior inventors have disclosed certain species of:

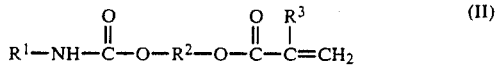

wherein $R^1$ is a monovalent aromatic or alkyl radical including from about 4 to about 20 carbon atoms, $R^2$ is a divalent alkyl radical including from about 2 to about 4 carbon atoms, and $R^3$ is hydrogen or methyl. Structures of this type are disclosed in U.S. Pat. No. 3,479,328, issued to Nordstrom on Nov. 18, 1969.

Other patents which may have some relevance in connection with this invention are U.S. Pat. No. 3,553,174, issued to Hausslein on Jan. 5, 1971; U.S. Pat. No. 3,645,977, issued to Wolgemuth et al. on Feb. 29, 1972; U.S. Pat. No. 3,783,151, issued to Carlick et al. on Jan. 1, 1974; and U.S. Pat. No. 4,279,833, issued to Culbertson, et al. on July 21, 1981. Of these patents, Nordstrom, Boranian, Culbertson, and Tefertiller, et al. teach coatings for flooring materials. However, the prior art has not disclosed the materials described and claimed herein as reactive diluents for ultraviolet curable flooring

SUMMARY OF THE INVENTION

A first aspect of the invention is a radiation curable coating composition. The primary component of the uncured coating is from about 25 to 95 percent, preferably from about 50% to about 90%, more preferably from about 50% to about 83% by weight of oligomeric polyethylene adipate linked to terminal acrylate moieties by toluene urethane linkages. The second component of the composition is a reactive diluent having the generic structure set forth in formula (II) above, wherein $R^1$, $R^2$, and $R^3$ are as previously defined. Reactive diluents meeting this defination form radiation curable compositions having lower volatility than prior compositions.

Surprisingly, cured acrylate films prepared by mixing, depositing, and curing the compositions described above have higher elongation, and higher tensile strength than films incorporating previously known reactive diluents.

A second aspect of the invention is a method for reducing the viscosity of a radiation curable coating composition, comprising the steps of providing a radiation curable coating composition having high viscosity and adding to the coating composition a viscosity reducing amount of the reactive diluent defined previously. The resulting material has utility as radiation curable coating composition for flooring.

DETAILED DESCRIPTION OF THE INVENTION

Radiation curable coating materials useful herein, sometimes described herein as oligomeric polyethylene adipate materials or oligomers, are compounds having the following general structure:

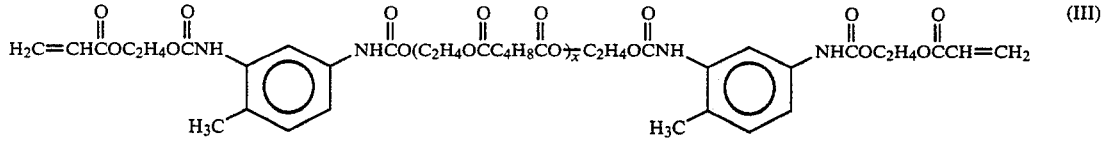

wherein x is from about 1 to 20. The oligomer is formed by reacting adipic acid (hexanedioic acid) with ethylene glycol, forming an A-B-A-B polyester having the desired molecular weight and terminated on each end by a hydroxyl group. The polyethylene adipate is then reacted with toluene diisocyanate under such conditions that one isocyanate of each toluene diisocyanate molecule reacts with one of the terminal hydroxyl groups to form a urethane linkage, leaving the other isocyanate group unreacted. This product is then reacted with hydroxyethylacrylate in the presence of a polymerization inhibitor. Each unreacted isocyanate moiety then reacts with the hydroxyl group of hydroxyethylacrylate, forming a urethane linkage connecting an acrylate group to each end of the prepolymer chain.

The preferred oligomers falling within the above-described generic description include UVITHANE 783 and 788 prepolymers, each commercially available from the Specialty Chemicals Division of Thiokol Corporation, Trenton, New Jersey.

The oligomer is the primary component of the complete composition, and the reactive diluent and other ingredients are added to advantageously modify its properties. In particular, since the oligomers described herein are solid materials at the preferred temperature for applying the subject coatings (roughly room temperature), enough of a reactive diluent is added to the oligomer to reduce its viscosity to about 1,000 centipoise at the desired temperature of application.

Reactive diluents useful herein, generically described by formula II and the substituents defined in the Background Art section above, are synthesized from an isocyanate of $R^1$ and a hydroxyalkylacrylate whose alkyl moiety is $R^2$. These compounds are prepared by reacting an aromatic or $C_4$-$C_{20}$ alkyl isocyanate with an omega-hydroxyalkylacrylate (wherein the alkyl moiety has from 2 to 4 carbon atoms) in the presence of a polymerization inhibitor.

Specific isocyanates which may be employed in the preparation of such reactive diluents include the following: isobutyl isocyanate, butyl isocyanate, pentyl isocyanate, hexyl isocyanate, heptyl isocyanate, octyl isocyanate, nonyl isocyanate, decyl isocyanate, undecyl isocyanate, dodecyl isocyanate, tridecyl isocyanate, tetradecyl isocyanate, pentadecyl isocyanate, hexadecyl isocyanate, heptadecyl isocyanate, octadecyl isocyanate, nonadecyl isocyanate, eicosyl isocyanate, phenyl isocyanate, and mixtures thereof. Preferred isocyanates for use herein are n-butyl isocyanate, n-octyl isocyanate, n-dodecyl isocyanate, n-octadecyl isocyanate, and phenyl isocyanate and mixtures thereof.

Omega-hydroxyalkylacrylates useful in the preparation of reactive diluents according to the present invention have the following generic formula:

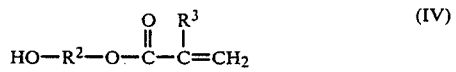

(IV)

wherein $R^2$ and $R^3$ are selected from the substituents previously defined. Specific omega-hydroxyalkylacrylates useful herein are hydroxyethylacrylate, hydroxyethylmethacrylate, hydroxypropylacrylate, and hydroxybutylmethacrylate and mixtures thereof.

The reaction between the hydroxyalkylacrylate and the isocyanate generally requires a small amount of a catalyst. Suitable catalysts include tertiary amines such as trimethylamine, diethylmethylamine, or ethyldimethylamine. Organometallic catalysts such as dibutyltin dilaurate or stannous octate may also be used. Since the reaction between the hydroxyalkylacrylate and isocyanate is exothermic, cooling apparatus is typically required to maintain a constant reaction temperature. Slow addition of the hydroxyalkylacrylate into the isocyanate is usually appropriate. To prevent premature cross-linking, a small amount of a polymerization inhibitor such as phenothiazine may be added to the isocyanate at the onset of the synthesis.

Other ingredients may be optionally added to the combination of a reactive diluent and an oligomer described herein to enhance the properties of the composition. Specific additives contemplated herein are photoinitiators selected from acetophenone or benzophenone derivatives, polymerization inhibitors selected from phenothiazine or methyl ether hydroquinone, and cross-linking agents selected from difunctional or trifunctional acrylates. Other additives and materials will suggest themselves to those of ordinary skill in the art, and may be used herein to the extent that they do not destroy the essential character of the compositions described herein.

EXAMPLES

The following examples are provided to illustrate how to make and use the invention, and to describe the preferred mode of practicing the invention. The examples do not define the scope of the invention, which is set forth in the claims.

EXAMPLE 1

To synthesize a reactive diluent, two equivalents (198 grams) of n-butyl isocyanate, 0.01 gram of phenothiazine, and 0.2 gram of stannous octoate were added to a reactor vessel equipped with a charging port, purging inlets and outlets, a thermometer, cooling apparatus, and an agitator. The reactor vessel was continuously purged with dry air throughout the synthesis. The reaction mixture was heated to 65° C. and agitated. Two equivalents (233 grams) of hydroxyethylacrylate were added dropwise. During the acrylate addition the reaction mixture was mixed continuously and its temperature kept below 80° C. After the acrylate addition was completed, the reaction mixture was mixed continuously and its temperature maintained at 80° C. for approximately four hours.

Forty grams of the reactive diluent so prepared were added to 60 grams of UVITHANE 788, an acrylate terminated urethane oligomer which is a low melting solid. Two grams of diethoxyacetophenone were added to the resulting solution.

The acrylic floor tile composition described above was applied to floor tiling, forming a 3 mil(76 micron) coating. The coating was cured with one pass through a Pittsbrugh Plate Glass (PPG) UV processor at 30 feet per minute (15 cm/sec). The cured, clear acrylic film possessed a nominal tensile strength of 4605 psi (324 kg/cm$^2$), a tensile loading of 1175 psi (82.68 kg./cm$^2$) at 25% modulus, and 75% elongation. (Tensile strength, tensile loading, and elongation were measured according to ASTM procedure D882-67.)

EXAMPLE II

Following the procedure of Example I, 2.5 equivalents (291 grams) of 2-hydroxyethylacrylate were added dropwise to 2.5 equivalents (268 grams) of phenylisocyanate in the presence of 0.3 grams of stannous octoate and 0.016 grams of phenothiazine.

30 Grams of the reactive diluent so formed were mixed with (1) 70 grams of UVITHANE 783 and (2) 70 grams of UVITHANE 788. Two grams of diethoxyacetophenone (DEAP) were added to each resulting solution.

The compositions were individually applied as 3 mil (76 micron) coatings to floor tiling and cured with one pass through the PPG UV processor at 30 feet per minute (15 cm/sec).

The UVITHANE 788 cured film had a tensile strength of 4402 psi (309 kg/cm$^2$) and an elongation of 15%. The UVITHANE 783 cured film had a tensile strength of 4700 psi (330.7 kg/cm$^2$) and an elongation of 35%.

The viscosity of UVITHANE 788 oligomer was from about 2200 to 4200 poise at 120 degrees Fahrenheit (40 degrees Celsius), about 300–750 poise at 160 degrees Fahrenheit (71 degrees Celsius), and about 100 to 200 poise at 180 degrees Fahrenheit (82 degrees Celsius) before the reactive diluent was added.

Although in the working examples provided above ultraviolet light was selected as the actinic curing radiation, other known forms of actinic radiation such as gamma rays, microwaves, infrared rays, visible light rays, electron beams, products of radioactive decay, x-rays, ultrasonic sound waves, and the like are contemplated for practicing the invention.

I claim:

1. A radiation-curable coating composition, comprising:
   A. from about 25% to about 95% by weight of an oligomeric polyethylene adipate linked to terminal acrylate moieties by toluene urethane linkages, and
   B. from about 5% to about 75% by weight of a reactive diluent having the formula:

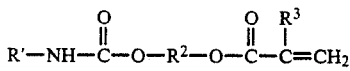

wherein R' is a monovalent aromatic or alkyl radical including from 4 to about 20 carbon atoms, R$^2$ is a divalent alkyl radical including from about 2 to about 4 carbon atoms, and R$^3$ is hydrogen or methyl.

2. The invention of claim 1, wherein R' is selected from the group consisting of isobutyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and phenyl radicals and mixtures thereof.

3. The invention of claim 1, wherein R' is selected from the group consisting of n-butyl, n-octyl, n-dodecyl, n-octadecyl, and phenyl radicals and mixtures thereof.

4. The invention of claim 1, wherein R' is selected from the group consisting of n-butyl and phenyl radicals.

5. The invention of claim 1, wherein R$^2$ is selected from the group consisting of ethylene and propylene radicals.

6. The invention of claim 1, wherein R$^2$ is an ethylene radical.

7. The invention of claim 1, comprising from about 90% to about 50% of said oligomeric polyethylene adipate and from about 50% to about 10% of said reactive diluent.

8. The invention of claim 1, comprising from about 60% to about 83% of said oligomeric polyethylene adipate and from about 71% to about 40% of said reactive diluent.

9. A method for reducing the viscosity of a radiation-curable coating material, comprising the steps of:
   A. providing a radiation-curable coating oligomer which is usually highly viscous; and
   B. adding to said coating oligomer a viscosity-reducing amount of a reactive diluent having the formula:

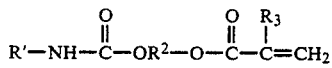

wherein R' is a monovalent aromatic or alkyl radical including from about 4 to about 20 carbon atoms, R$^2$ is a divalent alkyl radical including from about 2 to about 4 carbon atoms, and R$^3$ is hydrogen or methyl.

10. The invention of claim 9, wherein R' is selected from the group consisting of isobutyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and phenyl radicals and mixtures thereof.

11. The invention of claim 9, wherein R' is selected from the group consisting of n-butyl, n-octyl, n-dodecyl, n-octadecyl, and phenyl radicals and mixtures thereof.

12. The invention of claim 9, wherein R' is selected from the group consisting of n-butyl and phenyl radicals.

13. The invention of claim 9, wherein R$^2$ is selected from the group consisting of ethylene and propylene radicals.

14. The invention of claim 9, wherein R$^2$ is an ethylene radical.

15. The invention of claim 9, comprising from about 90% to about 50% of said oligomeric polyethylene adipate material, and from about 50% to about 10% of said reactive diluent.

16. The invention of claim 9, comprising from about 60% to about 83% of said oligomeric polyethylene adipate material, and from about 17% to about 40% of said reactive diluent.

* * * * *

UNITED STATES PATENT AND TRADEMARK OFFICE
CERTIFICATE OF CORRECTION

PATENT NO. : 4,507,188

DATED : March 26, 1985

INVENTOR(S) : Yuan C. Chu

It is certified that error appears in the above-identified patent and that said Letters Patent is hereby corrected as shown below:

Column 6, claim 8, line 3, change 71% to --17%--.

Signed and Sealed this

Fourth Day of June, 1991

Attest:

HARRY F. MANBECK, JR.

*Attesting Officer*    *Commissioner of Patents and Trademarks*